United States Patent [19]

Bartos

[11] 4,199,151
[45] Apr. 22, 1980

[54] METHOD AND APPARATUS FOR RETAINING SEALS

[75] Inventor: James W. Bartos, Wilmington, Ohio

[73] Assignee: General Electric Company, Cincinnati, Ohio

[21] Appl. No.: 933,257

[22] Filed: Aug. 14, 1978

[51] Int. Cl.$^2$ .............................................. F16J 15/28
[52] U.S. Cl. .......................................... 277/1; 277/9; 277/206 R; 277/236
[58] Field of Search ............. 277/1, 9, 11, 205, 206 R, 277/206 A, 235 R, 236

[56] References Cited

U.S. PATENT DOCUMENTS

| | | | |
|---|---|---|---|
| 2,615,734 | 10/1952 | Parry | 277/9 X |
| 2,701,150 | 2/1955 | Hornell | 277/9 X |
| 2,745,686 | 5/1956 | Anderson | 277/9 X |
| 3,192,690 | 7/1965 | Taylor | 277/205 X |
| 3,395,926 | 8/1968 | Gunder | 277/235 |
| 3,423,141 | 1/1969 | Pethis | 277/9 X |
| 3,797,836 | 3/1974 | Halling | 277/236 X |
| 3,825,364 | 7/1974 | Halila et al. | 277/53 X |
| 4,121,843 | 10/1978 | Halling | 277/206 R X |

FOREIGN PATENT DOCUMENTS 496641 10/1953 Canada ........................................ 277/9

*Primary Examiner*—Robert S. Ward, Jr.
*Attorney, Agent, or Firm*—Dana F. Bigelow; Derek P. Lawrence

[57] ABSTRACT

An annular E-seal is installed in a retainer ring in such a way as to have limited degrees of freedom in the radial and axial directions while being retained in a groove of the retainer ring during component assembly and disassembly. The relative diameters of the retainer ring and the seal leg are such that installation or removal of the seal can only be accomplished by a deliberate tipping of the seal leg in such a way as to reduce its effective projected radial height. Thus, once installed, the seal is connected to and remains with one of the elements defining the gap to be sealed.

16 Claims, 12 Drawing Figures

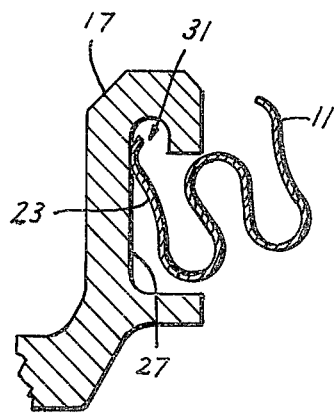
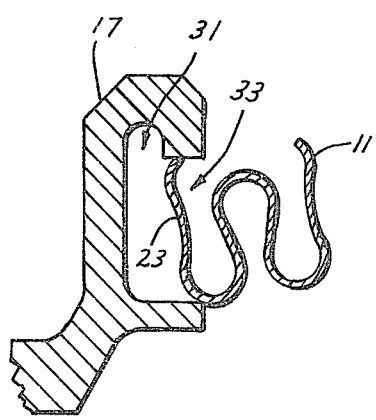
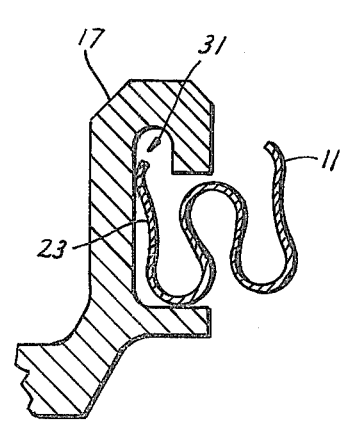
Fig 5     Fig 6     Fig 7
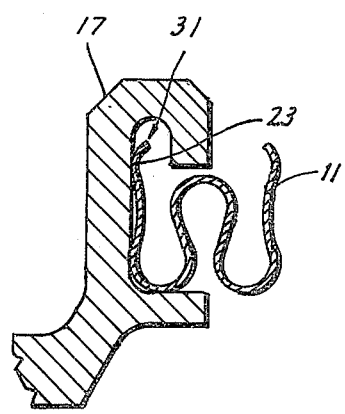
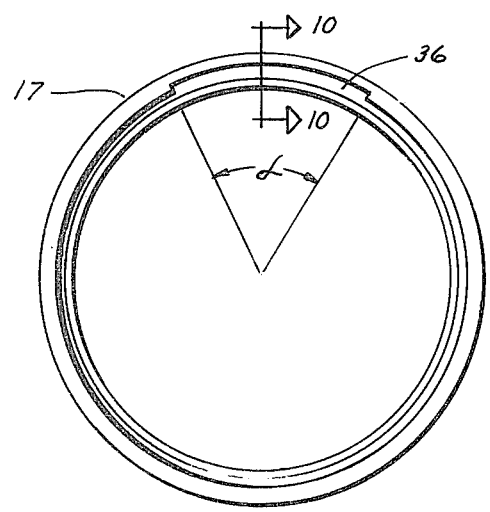
Fig 8     Fig 9
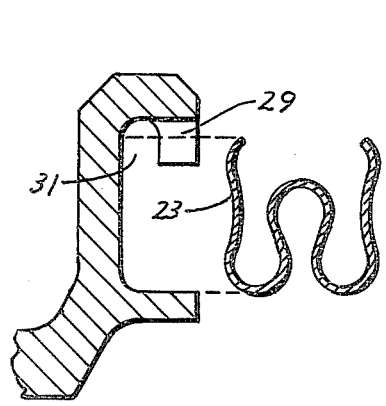
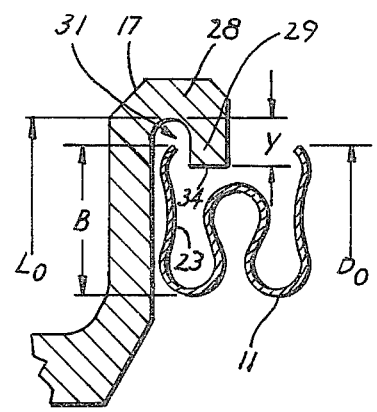
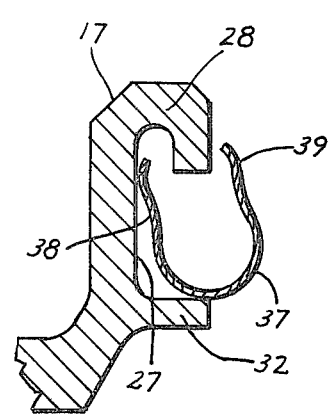
Fig 10     Fig 11     Fig 12

4,199,151

METHOD AND APPARATUS FOR RETAINING SEALS

The invention herein described was made in the course of or under a contract, or a subcontract thereunder, with the United States Department of the Air Force.

BACKGROUND OF THE INVENTION

This invention relates generally to seals and, more particularly, to structures for retaining seals in a desired position.

In turbomachine structures, it is necessary to provide sealing means between stationary and rotating components and, in some cases, between two stationary components which are susceptible to relative radial movement. One such interface is that between a nozzle support structure and a shroud support hanger immediately downstream thereof. The nozzle support structure is relatively fixed in its radial position but is susceptible to thermal growth and shrinkage as it is exposed to the hot airstream on its inner side and to the cooling airstream on its outer side. The shroud support hanger, on the other hand, is designed to be more sensitive to predetermined thermal growth patterns in order to accommodate thermal and mechanical growth of the rotor and thereby decrease the clearance between the shroud and the rotor structure. It is thus common to place a seal in axial relationship between the nozzle support and the shroud support hanger so as to allow the relative radial movement between the two elements while preventing the flow of high pressure cooling air from the outer side thereof to the hot gas stream on the inside thereof.

Problems which have been associated with such a seal application include that of assuring installation of the seal during the initial assembly procedure and that of insuring that when the system is disassembled for purposes of maintenance and repair, for example, the seal remains in its place or is replaced during the reassembly procedure. Present methods include the use of clips or pins or a combination of the two, any of which may be unreliable, complicated in assembly, and expensive.

It is therefore an object of the present invention to provide an improved method and apparatus for retaining an annular seal.

Another object of the present invention is the provision for a seal retaining structure which does not require the use of clips and/or pins.

Yet another object of the present invention is the provision for a seal retaining structure which is simple in construction, reliable in use and relatively inexpensive to fabricate.

These objects and other features and advantages become more readily apparent upon reference to the following description when taken in conjunction with the appended drawings.

SUMMARY OF THE INVENTION

Briefly, in accordance with one aspect of the invention, a retainer ring structure includes a radial flange whose inner diameter is closely coordinated with the outer diameter of one leg of an annular seal such that in order to install the seal leg into a groove in the retainer ring it is first necessary to deliberately and forcefully tip the leg of the seal such that it clears the inner diameter of the retainer ring radial flange. Once installed in the groove, the seal leg is free to move axially and radially within the groove but cannot be removed without again tipping the leg to reduce its outer diameter and thereby allow it to slip over the retainer ring flange and out of the groove.

By yet another aspect of the invention, the retainer ring includes a radially inner lip which forms the radially inner boundary of the retainer ring groove in which the leg of the seal is installed. There is then a gap formed between the outer diameter of the radially inner lip and the inner diameter of the retainer ring flange. The dimension of this gap is less than the radial height of the seal leg but greater than the height of the projected radial height of the seal leg when it is in the tipped position. In this way, the restricted dimension of the gap prevents both installation and removal of the seal leg into the retainer ring groove without first tipping the seal leg to reduce its projected radial height.

By yet another aspect of the invention, the retainer ring does not include a radially inner lip and the radial boundary of the seal leg movement is instead controlled by the radially outer portion of the retainer ring. Thus, the radial height of the retainer ring radial flange determines the radial depth of the retainer ring groove and is such that when the seal leg is in the most radially outer portion of the retainer ring groove, the seal leg, at a point 180° removed, will not clear, for purposes of installation or removal, the retainer ring radial flange without first tipping the seal leg.

In the drawings as hereinafter described, a preferred embodiment and modified embodiments are depicted; however, various other modifications and alternate constructions can be made thereto without departing from the true spirit and scope of the invention.

BRIEF DESCRIPTION OF THE DRAWINGS

FIGS. 5-8 are successive views of the seal and retainer ring during the installation process.

FIGS. 9 and 10 show a modified embodiment of the invention wherein a portion of the retainer ring is cut away for ease in installation.

FIG. 11 illustrates another embodiment of the present invention.

FIG. 12 shows the use of a U-shaped seal with the retainer ring.

DESCRIPTION OF THE PREFERRED EMBODIMENT

Figure 1:
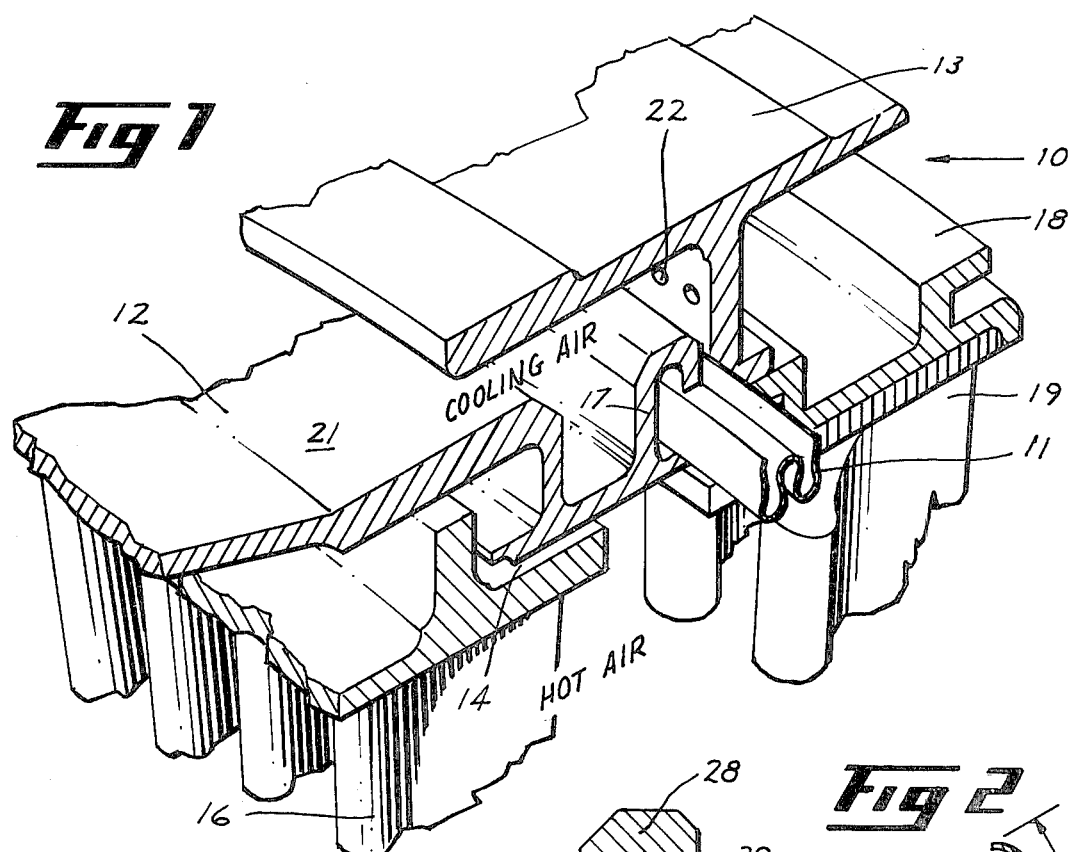
FIG. 1 is a fragmentary perspective view of a seal installation in accordance with the preferred embodiment of the invention.

Referring now to FIG. 1, the invention is shown generally at 10 wherein an E-seal 11 is installed in axial relationship between an outer nozzle support 12 and a shroud support hanger 13. The outer nozzle support 12 interconnects the outer band 14 of the row of nozzles 16 to other stationary elements of the engine (not shown), and provides both axial and radial support and positioning for the vanes. A rear portion 17 of the outer nozzle support 12 is substantially C-shaped in cross section and forms a retainer ring for receiving and retaining one leg of the E-seal 11.

The shroud support hanger 13 is also supported by other stationary elements (not shown) of the turbomachine and has attached to its radially inner portion a plurality of shroud segments 18 which form the outer boundary of the hot air flow path. Located in close radial relationship to the inner surface of the shroud segments 18 is a row of rotatable turbine blades 19 which derive energy from the hot gas flow in a manner well known in the art.

Located on the radially outer side of the nozzle support 12 is a plenum 21 for receiving high pressure cooling air from the compressor or the like for use in cooling the turbine shroud segments 18. The high pressure air passes through the plurality of ports 22 in the shroud support hanger 13 and is impinged on the shroud segments 18 by the flow through a perforated impingement plate (not shown).

The purpose of the E-seal 11 is to allow relative radial movement of the shroud support hanger 13 (for purposes of controlling the clearance between the shroud 18 and the row of turbine blades 19) with respect to the outer nozzle support 12, while at the same time preventing the flow of the relatively high pressure cooling air from the plenum 21 into the hot airstream.

Figure 2:
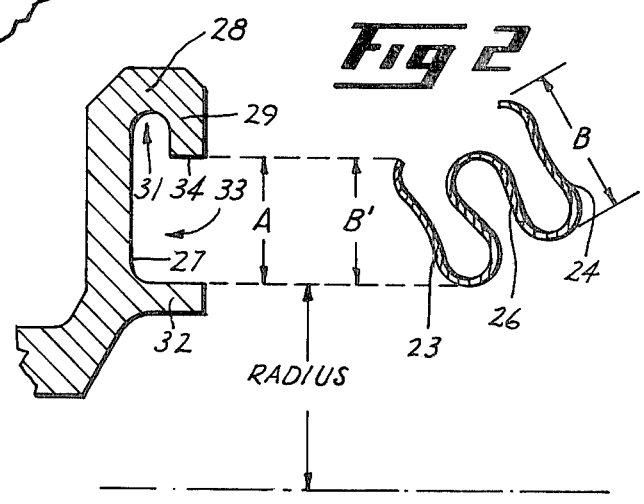
FIGS. 2 and 3 are sectional views of the retainer ring and E-seal with critical relative dimensions shown.
Figure 3:
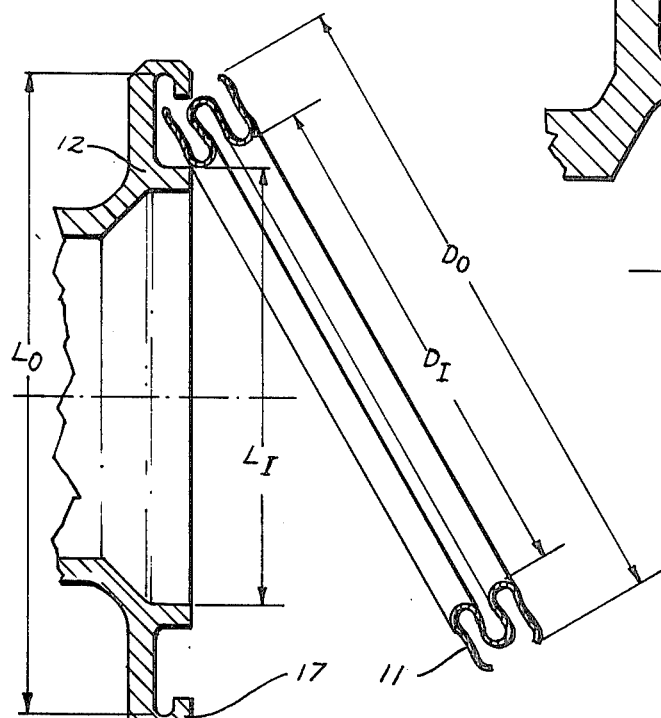

Referring more specifically to the outer nozzle support 12 and the E-seal 11 as shown in FIGS. 2 and 3, the E-seal 11 is a continuous annular ring with an E-shaped cross section as shown. It comprises curvilinear legs 23 and 24 interconnected by a central inverted U-shaped portion 26. The inner diameter of the E-seal 11 is equal to "$D_i$" and the outer diameter thereof is equal to "$D_o$". The radial height of each of the legs 23 and 24 is equal to a dimension "B", whereas the projected radial height of one of the legs when it is tipped with respect to the nozzle support rear portion, or retainer ring, 17, is equal to a lesser dimension "B'".

The retainer ring 17 is annular in form and includes a radial face 27, an axial flange 28 extending from the radially outer portion of the face 27, and a radial flange 29 extending inwardly from the axial flange 28 to define an annular groove 31 for receiving a leg 23 of the E-seal 11. Also comprising a part of the retainer ring 17 is a radially inner flange or annular lip 32 which extends axially from the radial face 27 to define a gap 33 between the lip 32 and the end 34 of the radial flange 29. The radial dimension of the gap 33 is designated as "A" which is less than the dimension "B" and greater than the dimension "B'". This dimensional relationship is established for the purpose of facilitating installation of the E-seal 11 into the groove 31 and retaining it in that position. That dimension between the lip 32 and the axial flange 28 of the retainer ring 17 is designated as "A'" and is greater than the dimension D of the seal leg 23 so as to allow radial movement of the seal 11 when it is in place within the annular groove 31. Thus, the inner diameter of the annular groove 31, designated as "$L_i$" is smaller than the inner diameter "$D_i$" of the seal, and the outer diameter of the annular groove, designated as "$L_o$" is greater than the outer diameter "$D_o$" of the seal.

Figure 4:
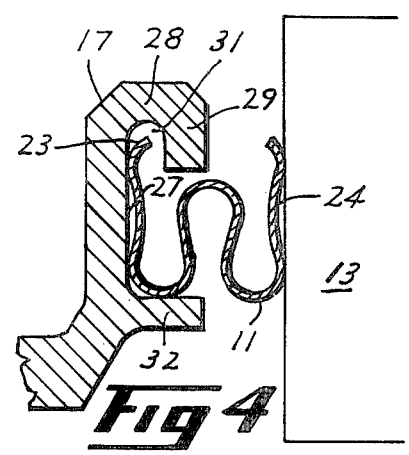
FIG. 4 is a cross-sectional view of the seal in the installed position.

The position of the E-seal 11 when installed in accordance with the present invention is shown in FIG. 4 wherein one of the seal legs 23 is disposed in the annular groove 31 so as to engage the radial face 27 of the retainer ring 17 for establishing a sealing relationship between the two elements. The other seal leg 24 is spring-biased against the surface of the shroud support hanger 13 to complete the bridging of the gap and to prevent the flow of high pressure cooling air therethrough. The seal 11 is allowed to flex axially between the two elements, and is free to move radially to some degree within the annular groove 31.

Installation of the E-seal 11 into the groove 31 of the retainer ring 17 is illustrated in FIGS. 5–8. The seal 11 is first tipped to the attitude shown in FIGS. 2 and 3 wherein the projected radial height of the leg 23 is equal to B' such that one point of the seal is insertable in the gap 33 and can then enter the annular groove 31 to engage the radial face 27 as shown in FIG. 5. From that initial point, adjacent points of the E-seal are then pushed down and twisted to the attitude shown in FIG. 2 such that successive portions are inserted into the gap 33 (see FIG. 6) and into the groove 31 and against the radial face 27 as shown in FIG. 7. This process is continued around the circumference of the seal until the entire seal is placed within the groove 31 as shown in FIG. 8. It should be mentioned that the twisting and insertion of the seal leg 23 is relatively easy during the initial and intermediate stages since the entire ring can be tipped to accommodate the tipping of the leg 23. However, during the final stages of installation, wherein most of the annular seal is held in its fixed position within the groove 31, it is more difficult to tip the seal leg 23 and it may be necessary to apply a substantial amount of pressure in order to effect the tipping. Of course, the smaller the diameter of the seal 11, the more pressure will be required at the final stages of installation. This requirement may be somewhat eased by a modification of the retainer ring 17 as shown in FIGS. 9 and 10.

In this modified embodiment, there is a sector 36 wherein the radial flange 29 is removed to facilitate easy installation of the leg 23 into the groove 31. The size of this sector 36, as indicated by the angle α, of course, will depend on the seal diameter and force requirements of the particular application. Another alternative, of course, would be to remove only a radial portion of the radial flange 29 so as to retain a flange around the entire circumference and yet provide for the easing of the final installation force requirements.

Another modified embodiment of the invention is shown in FIG. 11 wherein the retainer ring 17 has no radially inner flange or lip but instead controls the radial position of the seal by way of the axial flange 28. In other words, in the preferred embodiment as shown in FIG. 3, the radial position of the seal 11 is controlled by way of the interface between the inner surface of the seal 11 and the outer surface of the lip 32, and in this way the seal leg 23 never engages the surface of the axial flange 28. In the FIG. 11 embodiment, the radial position of the seal 11 is instead controlled by the interface between the outer surface of the seal leg 23 and the inner surface of the axial flange 28. Thus, dimension "Y" between the end 34 of the radial flange 29 and the radially inner surface of the axial flange 28 is critical to the installation and the retaining of the seal within the groove 31. The combined dimensions of the outer diameter "$D_o$" of the seal and the radial height "Y" of the radial flange 29 must be greater than the diameter "$L_o$" of the slot 31 in order that the seal, when installed, remains within the slot 31. In order to facilitate installation, on the other hand, the combined dimensions of the radial height "Y" of the radial flange 29 and the "projected diameter" of the seal (i.e., when the seal leg is tipped such that its projected radial height is reduced from the dimension "B" to "B'") must be less than the diameter "$L_o$" of the slot 31.

Although the invention has thus far been described in terms of use with an E-seal, it should be understood that other seal forms may also be used with the present invention. For example, a U-shaped seal 37 may be used as shown in FIG. 12 wherein one leg 38 rests against the radial face 27 and the other leg 39 rests against the surface of the shroud support hanger (not shown). Other shapes, as for example a C-shaped seal, may also be used in accordance with the present invention.

Therefore, having described a preferred and modified embodiments of the invention, what is desired to be secured by Letters Patent of the United States is as follows:

I claim:

1. An improved retaining structure for a continuous annular seal of the type which includes a U-shaped cross section with one leg having a predetermined radial height and adapted to sealingly engage a radial face of a ring wherein the improvement comprises:
   (a) an inner annular flange extending axially from said ring radial face and
   (b) an outer annular flange extending axially from said ring radial face to define a large radial gap between said outer and inner annular flanges and then radially inward toward said inner annular flange to define a small radial gap between said outer and said inner annular flanges, said small radial gap being smaller than said leg predetermined radial height but larger than a projected radial height when the seal leg is tipped, such that the seal leg may be inserted through said small gap into said large gap by temporarily tipping and inserting successive portions of the seal leg.

2. An improved retaining structure as set forth in claim 1 wherein the outer diameter of the seal leg is greater than the outer diameter of said small gap.

3. An improved retaining structure as set forth in claim 1 wherein the outer diameter of the seal leg is less than the outer diameter of said large gap.

4. An improved retaining structure as set forth in claim 1 wherein said inner annular flange is a continuous 360° flange.

5. An improved retaining structure as set forth in claim 1 wherein said outer annular flange is a continuous 360° flange.

6. An improved retaining structure as set forth in claim 1 wherein that portion of said outer annular flange which extends radially inward is discontinuous to present a circumferential gap to facilitate installation of the seal leg.

7. An improved retaining structure as set forth in claim 1 wherein the seal is E-shaped in cross section, and further wherein the central portion has a radial height which is less than said small gap.

8. A method of installing a continuous annular seal having a U-shaped cross section and a leg with a predetermined radial height into a retainer slot having inner and outer annular flanges mutually defining a radial gap which is less than the predetermined radial height comprising the steps of:
   (a) inserting one point of the seal leg into the retainer slot; and
   (b) inserting successively adjacent portions of the seal into the retainer slot by temporarily tipping each portion of the seal leg such that the projected radial height of the seal leg is less than the dimension of the gap.

9. The method as set forth in claim 8 and including the steps of providing a circumferential gap in the radial annular flange and inserting a portion of the seal into the retaining slot by way of said annular gap.

10. The method as set forth in claim 9 wherein the step of inserting a portion of the seal into the retaining slot by way of said annular gap is the last step.

11. An improved seal retaining ring of the type having a radial wall engageable by a continuous annular seal flexible leg having a predetermined outer diameter wherein the improvement comprises:
   (a) an axial annular flange extending from the radial wall to define the radially outer boundary for the seal; and
   (b) a radial annular flange extending inwardly from said axial annular flange to define with the radial wall and said axial annular flange a retainer slot for the seal, the inner diameter of said axial annular flange being smaller than the combination of said flexible leg predetermined outer diameter and the radial height of said radial annular flange, but larger than the combination of the radial height of said radial annular flange and a reduced flexible leg diameter when the seal leg is tipped at a point, such that the seal may be inserted into said retainer slot by temporarily tipping and inserting successive portions of the seal leg.

12. An improved seal retaining ring as set forth in claim 11 wherein the inner diameter of said axial annular flange is such that when a first point on the seal leg is moved radially outward in the retaining slot so as to engage the axial annular flange at a second point 180° from said first point, the leg will not pass across the inner edge of said radial annular flange without first being tipped.

13. An improved seal retaining ring as set forth in claim 11 wherein said radial annular flange is a continuous 360° flange.

14. An improved seal retaining ring as set forth in claim 13 wherein said radial annular flange is discontinuous to present a gap to facilitate installation of the seal leg.

15. An improved seal retaining ring as set forth in claim 11 wherein the seal is E-shaped in cross section.

16. An improved seal retaining ring as set forth in claim 11 wherein the seal is U-shaped in cross section.

* * * * *